US006761271B1

(12) United States Patent
Cresswell

(10) Patent No.: US 6,761,271 B1
(45) Date of Patent: Jul. 13, 2004

(54) RINSE SCREEN FOR A WATER BUCKET

(76) Inventor: Lynn J. Cresswell, 5919 - 156th St. Ct. E., Puyallup, WA (US) 98375

( * ) Notice: Subject to any disclaimer, the term of this patent is extended or adjusted under 35 U.S.C. 154(b) by 0 days.

(21) Appl. No.: 09/681,912

(22) Filed: Jun. 25, 2001

(51) Int. Cl.[7] ............................ B01D 29/03; B01D 35/28
(52) U.S. Cl. ........................ 210/456; 210/464; 210/467; 210/477; 210/482; 210/495; 210/498; 210/513
(58) Field of Search ................................ 210/464, 467, 210/498, 495, 466, 513–514, 473, 477, 482, 456, 523, 518, 497, 532.1, 470–471, 474–476, 480–481, 497.1, 497.3; 4/652, 658; 15/264; 220/540, 544, 554, 528, 530, 731; D7/406

(56) References Cited

U.S. PATENT DOCUMENTS

| 44,311 | A | * | 9/1864 | Hill .............................. 210/478 |
|---|---|---|---|---|
| 846,060 | A | * | 3/1907 | Selg .......................... 210/221.1 |
| 1,488,930 | A | * | 4/1924 | Mannix ......................... 15/264 |
| 1,553,023 | A | * | 9/1925 | Bonnell ......................... 15/142 |
| 2,546,041 | A | * | 3/1951 | Newton et al. ........... 15/104.92 |
| 2,671,239 | A | * | 3/1954 | Wisner ........................ 134/156 |
| 3,516,478 | A | * | 6/1970 | Dunn et al. .................. 164/423 |
| 3,549,044 | A | * | 12/1970 | Lerner ......................... 220/719 |
| 4,235,340 | A | * | 11/1980 | Clack et al. ................. 206/515 |
| 4,613,439 | A | * | 9/1986 | Fuhs ........................... 210/471 |
| 4,867,880 | A | * | 9/1989 | Pelle et al. .................. 210/474 |
| 5,143,178 | A | * | 9/1992 | Latham, Jr. .................. 184/106 |
| 5,291,921 | A | * | 3/1994 | Devine .......................... 141/86 |
| 5,449,459 | A | * | 9/1995 | Glaser et al. ................ 210/483 |
| 5,868,946 | A | * | 2/1999 | Nguyen ....................... 137/546 |
| 6,161,701 | A | * | 12/2000 | Biesinger .................... 141/338 |
| 6,379,630 | B1 | * | 4/2002 | Wilfong et al. ......... 108/144.11 |

* cited by examiner

Primary Examiner—W. L. Walker
Assistant Examiner—Marianne S. Ocampo
(74) Attorney, Agent, or Firm—David L. Tingey

(57) ABSTRACT

A wash bucket screen has a slanting platform supported on a frustum skirt. The platform has a plurality of holes interspersed between raised ridges on the platform running radially generally toward its perimeter as an aid in releasing water from a cloth squeezed against the platform. To effectively prevent backsplash from the bucket bottom back through the screen, the holes taper from a diameter sized to readily collect water on the platform top to a smaller hole diameter on the platform bottom. The skirt includes a flange on its distal end that engages the bucket wall. To accommodate a frustum bucket with changing wall diameter, the skirt flexes resiliently with the flange engaging the bucket wall and the skirt flexing inward as the screen is inserted in a bucket with decreasing diameter. To allow movement of the skirt, a plurality of slits extend vertically, opening at the skirt distal end, providing an effective splash shield between the skirt and the bucket wall. A plurality of vertical channels open between the platform and the skirt distal end to conduct water and debris flowing from the platform to the bucket bottom.

10 Claims, 2 Drawing Sheets

RINSE SCREEN FOR A WATER BUCKET

BACKGROUND OF INVENTION

This invention relates to screens for wash buckets, and more specifically to a slanted platform supported on a skirt adapted to engage a bucket wall.

It is commonplace to have a bucket for cleaning, such as for washing a car or a floor. A cleaning cloth becoming dirty in use is rinsed in water in the bucket. Debris and dirt are thus transferred into the bucket and settle on the bucket bottom. When the cloth is again rinsed in the bucket, the cloth is subject to picking up that debris and the dirty water at the bucket bottom. It is advantageous to separate debris and dirtier water in the bucket bottom from the cloth being rinsed.

SUMMARY OF INVENTION

An object of the present invention is to provide a screen for use with a traditional wash bucket that assists a user in rinsing his washing cloth while effectively separating the cloth from dirty rinse water and debris in the bucket. This object is achieved in a wash bucket screen having a slanting platform supported on a frustum skirt. The platform has a plurality of holes interspersed between raised ridges on the platform running radially generally toward its perimeter as an aid in releasing water from a cloth squeezed against the platform.

To effectively prevent backsplash from the bucket bottom back through the screen, the holes taper from a diameter sized to readily collect water on the platform top to a smaller hole diameter on the platform bottom.

The skirt includes a flange on its distal end that engages the bucket wall. To accommodate a frustum bucket with changing wall diameter, the skirt flexes resiliently with the flange engaging the bucket wall and the skirt flexing inward as the screen is inserted in a bucket with decreasing diameter. To allow movement of the skirt, a plurality of slits extend vertically, opening at the skirt distal end, providing an effective splash shield between the skirt and the bucket wall.

A plurality of vertical channels open between the platform and the skirt distal end to conduct water and debris flowing from the platform to the bucket bottom.

A finger hole in the platform aids in removing the screen from the bucket.

The screen can be used with water in the bucket below the screen, in which case water from the washing cloth is squeezed into the bucket by aid of the screen. Fresh water is obtained elsewhere. The screen can also be used with water in the bucket above the screen, in which case the screen separates more dirty water and debris settling below the screen from cleaner water above the screen. The washing cloth is then rinsed in the cleaner water without stirring water below the screen into the cloth, the dirtier water being effectively blocked by the screen, causing a natural separation within the water. Upon each rinse of the cloth, dirty water, rocks and debris from a rinsed cloth settle through the screen holes into the bottom of the bucket, generally before the cloth is rinsed again in preparation for a subsequent cloth rinsing.

DETAILED DESCRIPTION

Figure 1:
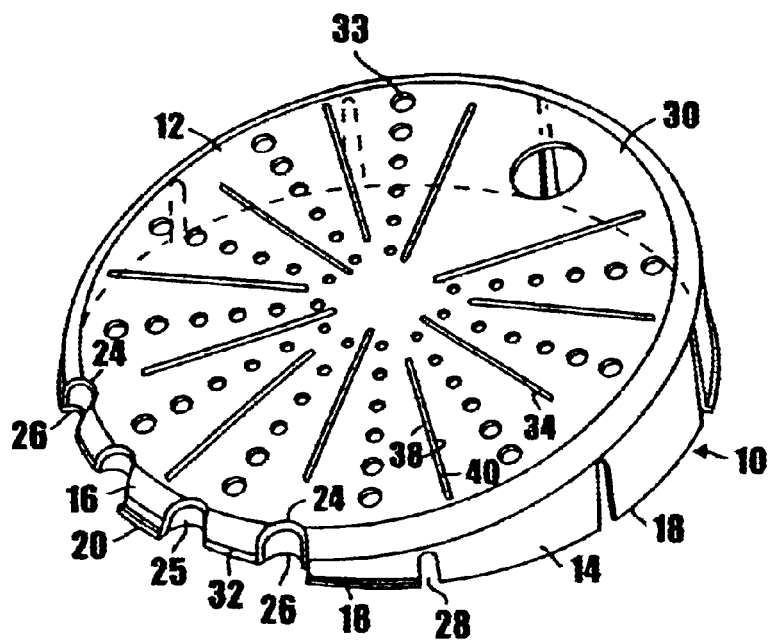
FIG. 1 is a perspective view of the wash bucket screen of the present invention.
Figure 2:
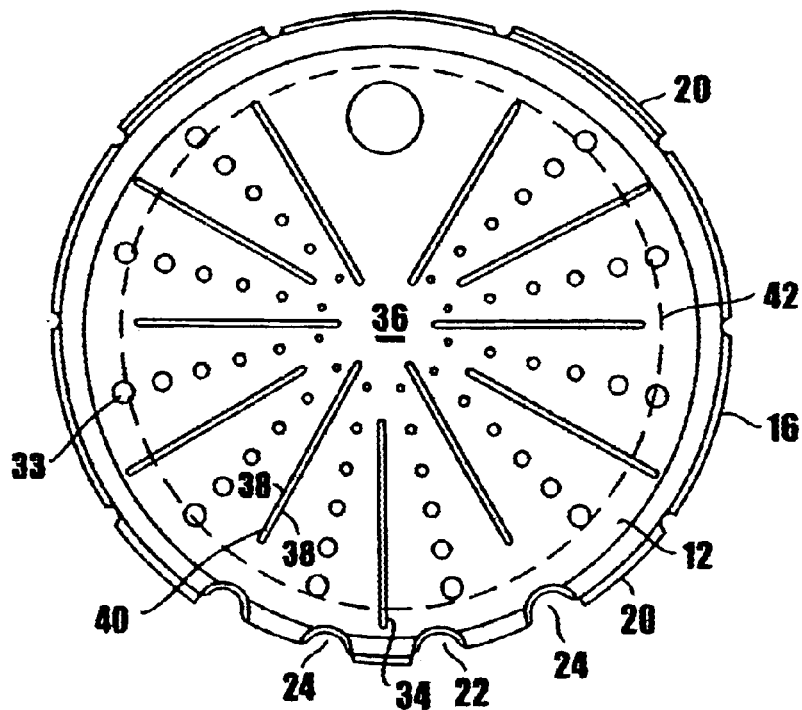
FIG. 2 is a top view of the wash bucket screen of FIG. 1.
Figure 3:
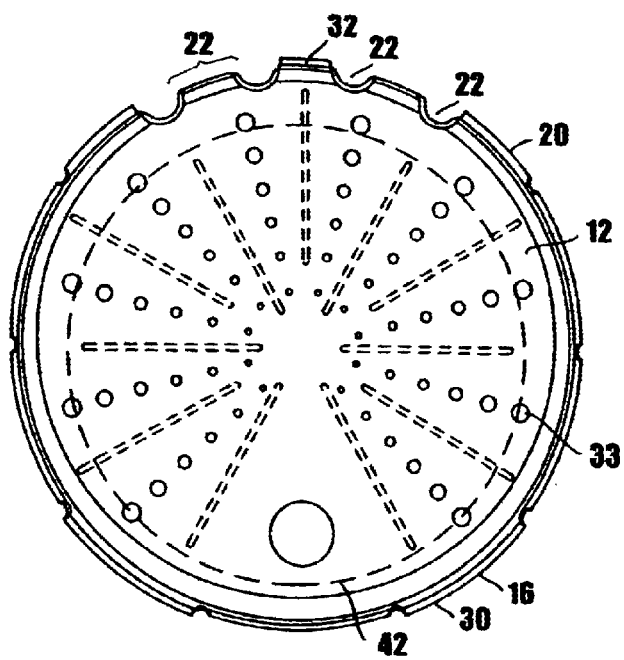
FIG. 3 is a bottom view of the wash bucket screen.
Figure 4:
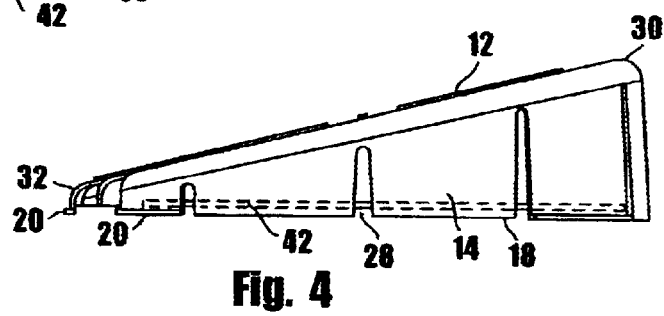
FIG. 4 is a side view of the wash bucket screen.
Figure 5:
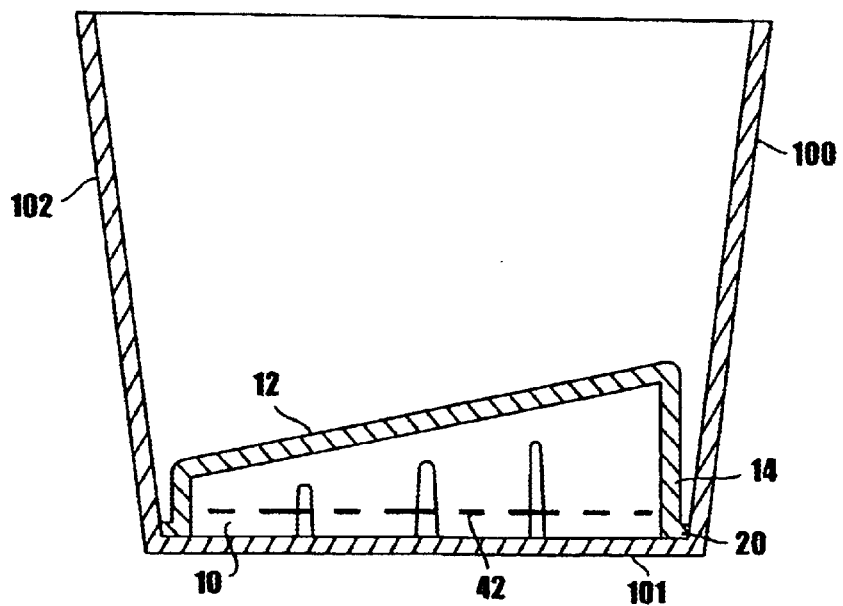
FIG. 5 is a cut-away view showing the screen in place in a bucket.

The wash bucket screen 10 of the present invention is intended to be used in a typical cylindrical water bucket 100 having a bottom 101 and walls or a single cylindrical or frustum wall 102 though a rectangular screen for use with a rectangular bucket (not shown) is intended to be included in this disclosure.

The skirt 14 supports the platform 12 above a skirt distal end 34 adapted to rest on the bucket bottom 101. The skirt 14 is sized to extend to the bucket wall or walls 102 and flexes resiliently to adapt to the bucket wall or walls as the skirt extends to the wall or walls thus providing an effective splash shield between the screen and the bucket wall. A flange 32 on the skirt distal end 34 extends horizontally from the skirt 14 to engage the bucket wall 102. To allow the skirt 14 to flex and adapt to a narrowing bucket wall diameter, the skirt has vertical slits 36 opening to the skirt distal end 34 allowing the skirt 14 to bend resiliently as the flange 32 rides on the bucket wall 102.

The platform 12 and skirt 14 also include channels 38 on the platform perimeter 30 at lower perimeter portions 22 that extend along the skirt 14 to the skirt distal end 34. Run-off and debris from the platform is thus received in the channels and channeled to the bucket bottom outside of the skirt.

The screen comprises a planar platform 12 supported on a skirt 14 depending from the platform 10. The platform 12 typically slants from a platform upper portion 15 to a platform lower portion 16. For example, the platform 12 in a preferred embodiment slants from the platform upper portion 14 at a first perimeter portion 18 to a platform lower portion 16 on a perimeter lower portion 22. The platform 10 includes a plurality of holes 24 therethrough that provides for water to pass through to the bucket bottom 101. The platform 10 further comprises a plurality of ridges 26 disposed radially on the platform 12 from a center 28 to a platform perimeter 30. The ridges 26 assist a user in rinsing water from a washing cloth.

What is claimed is:

1. A wash bucket screen for use in a water bucket having a bottom and wall, comprising:
   a planar platform with a plurality of holes therethrough arrayed throughout the platform generally, the platform slanting from a high platform perimeter portion to a lower platform perimeter portion causing debris to slide off the platform over the platform perimeter,
   a skirt depending vertically from a platform perimeter at a skirt proximal end supporting the platform above a skirt distal end adapted to rest within the bucket on the bucket bottom, and
   a flange extending horizontally outward from the skirt.

2. The wash bucket screen of claim 1 where in the platform skirt flexes resiliently to accommodate a narrowing bucket wall with the flange extending to a bucket wall.

3. The wash bucket screen of claim 2 wherein the skirt has vertical slits opening to a skirt distal end allowing skirt portions between slits to bend resiliently as the flange rides on the bucket wall.

4. A wash bucket screen for use in a water bucket having a bottom and a wall, comprising:

a platform with a plurality of holes therethrough arrayed throughout the platform generally, a skirt depending vertically from a platform perimeter at a skirt proximal end supporting the platform above a skirt distal end adapted to rest on a bucket bottom, wherein the platform includes channels in the skirt opening at the platform perimeter at the lower perimeter portion channeling debris from the platform to the bucket bottom outside the skirt.

5. The wash bucket screen of claim 4 wherein the platform skirt is adapted to extend to a bucket wall providing an effective splash shield between the screen and the bucket wall.

6. The wash bucket screen of claim 4 wherein the platform further comprises a plurality of ridges.

7. The wash bucket screen of claim 6 wherein the ridges are disposed radially on the platform from a center to a platform perimeter.

8. A wash bucket screen for use in a water bucket having a bottom and walls or a single cylindrical or rustum wall, comprising:

a planar platform slanting from a high perimeter portion to a lower perimeter lower portion, a skirt depending vertically from a platform perimeter at a skirt proximal end, adapted to support the platform above a skirt distal end, the platform having a plurality of holes therethrough arrayed throughout the platform generally allowing water to pass through wherein the skirt flexes resiliently to accommodate a narrowing bucket wall providing an effective splash shield between the screen and the bucket wall, the skirt having vertical slits opening to the skirt distal end allowing skirt portions between slits to bend resiliently as a flange extending horizontally from the skirt rides on the bucket wall, wherein the platform and skirt include channels in the skirt opening at the platform on the platform perimeter at the lower perimeter portion and extending along the skirt channeling debris from the platform to the bucket bottom outside the skirt.

9. The wash bucket screen of claim 8 wherein the platform further comprises a plurality of ridges disposed radially on the platform from a center to a platform perimeter.

10. A wash bucket screen for use in a water bucket having a bottom and walls or a single cylindrical or frustum wall, comprising a planar platform slanted from horizontal in a single plane having a plurality of holes therethrough and supported above a bucket bottom on a vertical skirt depending from a platform perimeter and sized to flexibly engage a water bucket wall or walls above the bucket bottom, and the skirt having channels opening at the platform perimeter at a lower perimeter portion and channeling debris from the slanted planar platform to the bucket bottom outside the skirt.

* * * * *